(12) United States Patent
Muller et al.

(10) Patent No.: US 6,898,491 B2
(45) Date of Patent: May 24, 2005

(54) PROCESS AND DEVICE FOR AUTOMATICALLY CONTROLLING THE THRUST OF AT LEAST ONE ENGINE OF AN AIRCRAFT DURING A PHASE OF HORIZONTAL FLIGHT AT STABILIZED SPEED

(75) Inventors: Jean Muller, Tournefeuille (FR); Didier Graves, Pibrac (FR)

(73) Assignee: Airbus France, Toulouse (FR)

(*) Notice: Subject to any disclaimer, the term of this patent is extended or adjusted under 35 U.S.C. 154(b) by 27 days.

(21) Appl. No.: 10/674,794

(22) Filed: Oct. 1, 2003

(65) Prior Publication Data
US 2004/0111191 A1 Jun. 10, 2004

(30) Foreign Application Priority Data
Oct. 2, 2002 (FR) .............................. 02 12174

(51) Int. Cl.[7] .......................... G06F 17/00; B64C 11/48
(52) U.S. Cl. .......................................... 701/3; 244/75 R
(58) Field of Search .................... 701/3, 11; 244/12.1, 244/12.4–12.5, 23 D, 75 R, 76 R, 177, 110 B; 60/226.2, 228, 233

(56) References Cited
U.S. PATENT DOCUMENTS

| 4,422,147 A | 12/1983 | Hanke |
| 4,569,021 A | 2/1986 | Larson et al. |
| 4,764,872 A | * 8/1988 | Miller ............................. 701/3 |
| 4,772,180 A | * 9/1988 | Walker et al. ................. 416/33 |
| 5,833,177 A | * 11/1998 | Gast ............................ 244/195 |

FOREIGN PATENT DOCUMENTS

EP 0482250 4/1992

* cited by examiner

*Primary Examiner*—Thu V. Nguyen
(74) *Attorney, Agent, or Firm*—Stevens, Davis, Miller & Mosher, LLP

(57) ABSTRACT

Automatic control of the thrust of an aircraft engine may include: (1) calculating a first difference between a measured speed and a reference speed of an aircraft to determine an intermediate term and (2) calculating a second difference between the intermediate term and a previously selected corrector term. If the second difference is greater than a threshold value, then the intermediate term is selected as a current corrector term. Otherwise, the previously selected corrector term is selected. The selected corrector term and an equilibrium term, which produces an equilibrium rating of the engine in the absence of disturbances, are summed to produce a control value, and the control value is applied to the engine.

9 Claims, 2 Drawing Sheets

PROCESS AND DEVICE FOR AUTOMATICALLY CONTROLLING THE THRUST OF AT LEAST ONE ENGINE OF AN AIRCRAFT DURING A PHASE OF HORIZONTAL FLIGHT AT STABILIZED SPEED

FIELD OF THE INVENTION

The present invention relates to a process and device for automatically controlling the thrust of at least one engine of an aircraft during a phase of horizontal flight at stabilized speed, in particular during a phase of cruising flight of a transport airplane.

More precisely, it applies to the case where the thrust of the engine or engines is controlled automatically by a standard autothrust system.

BACKGROUND OF TEE RELATED ART

It is known that, in this case, the autothrust system automatically regulates the rating of the engines, in a continuous manner, as a function of the deviation between the measured speed of the aircraft and the preset speed. Such an autothrust system therefore makes it possible to produce a stabilized (on the preset speed) speed of the aircraft.

However, by reason of the generation of a continuous (or permanent) variation of the rating of the engine or engines, which gives rise to a permanent variation of the sound frequencies emitted by the engines (the sound frequencies varying of course with the rating of the engines) this autothrust system therefore has the drawback of causing a permanent variation in the noise emitted by the engine or engines, thereby reducing acoustic comfort, in particular of the passengers of the aircraft. However, on a transport airplane in particular, the comfort of the passengers is essential during a phase of horizontal flight at stabilized speed such as a cruising phase, which may last several hours.

SUMMARY OF THE INVENTION

The object of the present invention is to remedy these drawbacks. It relates to a process for automatically controlling the thrust of at least one engine of an aircraft during a phase of horizontal flight at stabilized speed, which process makes it possible to improve the acoustic comfort of the passengers of the aircraft.

For this purpose, according to the invention, said process according to which the thrust of the engine is automatically controlled by applying a control value thereto which corresponds to the value of a predetermined control parameter representative of the rating of said engine, and according to which the following set of steps is carried out automatically and repeatedly:

a) an actual speed corresponding to the actual value of the speed of the aircraft is measured;
b) a preset reference speed corresponding to the speed of the aircraft, representative of the control value obtained from the previous set of steps, is determined;
c) a first difference between said actual speed and said preset speed is calculated;
d) an intermediate term dependent on said first difference is determined for said control parameter, said intermediate term making it possible to obtain a corrector term;
e) the sum is computed of said corrector term and of an equilibrium term which produces an equilibrium rating of the engine in the absence of disturbances so as to obtain said control value; and f) the control value thus obtained is applied to said engine, is noteworthy in that in step d):

a second difference between said intermediate term of the present set of steps and the corrector term of the previous set of steps is calculated;

this second difference is compared with a predetermined threshold value; and one selects as corrector term for the present set of steps, that is used in particular in step e):

said intermediate term of the present set of steps, if said second difference is greater than said threshold value; and said corrector term of the previous set of steps, if said second difference is less than or equal to said threshold value.

Thus, as long as the second difference is less than or equal to the threshold value, the same corrector term is retained so that the control value is not modified (the relatively stable equilibrium term being modified only when it is appropriate to vary the equilibrium rating, that is to say generally the preset speed). The control value (and thus the control of the rating or of the thrust) is therefore modified only when said second difference (which depends on said first difference) exceeds said threshold value, that is to say when this is necessary for the feedback control of the speed, given the deviations (first difference) between the actual speed and the preset speed of the aircraft. Consequently, by virtue of the present invention, the rating of the engine is not regulated in a continuous (or permanent) manner, but it is regulated in a discrete manner. This results in a very appreciable improvement in the acoustic comfort of the passengers of the aircraft, since the sound frequencies of the noises emitted by the engines are no longer modified permanently.

Advantageously, said selected corrector term is filtered before using it in step e), thereby enabling a modification of the rating of the engine to be rendered less abrupt as appropriate and hence enabling the acoustic comfort of the passengers to be improved still further.

Within the framework of the present invention, said predetermined control parameter is the speed of rotation N1 of the engine or the engine pressure ratio EPR of said engine.

In the first case (control parameter: speed of rotation N1), said threshold value is advantageously equal to 0.5% of the preset value of the speed of rotation of the engine. This threshold value, as well as the time constant of the filter for filtering the corrector term, may be determined empirically, in particular with the aid of physiological studies performed on passengers of the aircraft.

Moreover, in said first case, advantageously, in step d), said intermediate term is determined by computing the sum:

of a first term which is proportional to said first difference; and of a second term which:

corresponds to the integration of said first difference if the following conditions $\alpha$ and $\beta$ are satisfied:

$\alpha$) said first difference is greater than a predetermined value; and $\beta$) said actual speed does not diverge from said preset speed; and is equal to zero, if at least one of the above conditions $\alpha$ and $\beta$ is not satisfied.

The present invention also relates to a method of control of the thrust of at least one engine of an aircraft during a phase of horizontal flight at stabilized speed, said method comprising at least one first process of control of thrust of standard type.

According to the invention, said method is noteworthy in that it moreover comprises a second process of control of thrust, in that said second control process corresponds to the process specified above, in that account is taken of the results of said first control process under normal operation, and in that one automatically switches into said second control process so as to take account of the results of the latter when at least one of a plurality of predetermined conditions is satisfied.

Advantageously, said predetermined conditions comprise at least the following conditions:

the actual speed of the aircraft is stabilized, being to within a predetermined value, equal to the preset speed;

the conditions of calculation of said equilibrium term are valid;

an autothrust function of the aircraft is engaged in speed holding mode; and an automatic pilot of the aircraft is active in altitude holding mode.

The present invention also relates to a device for automatically controlling the thrust of at least one engine of an aircraft during a phase of horizontal flight at stabilized speed.

According to the invention, said device of the type comprising:

means for measuring an actual speed corresponding to the actual value of the speed of the aircraft;

means for determining a preset speed corresponding to the aircraft's speed representative of a control value;

means for calculating a first difference between said actual speed and said preset speed;

means for determining, for a control parameter, an intermediate term dependent on said first difference, said intermediate term making it possible to obtain a corrector term;

means for computing the sum of said corrector term and of an equilibrium term which produces an equilibrium rating of the engine in the absence of disturbances so as to obtain a control value; and means for applying the control value thus obtained to said engine, is noteworthy in that it moreover comprises:

means for calculating a second difference between said intermediate term and, a previously recorded corrector term;

means for comparing this second difference with a predetermined threshold value;

means for selecting as corrector term:

said intermediate term, if said second difference is greater than said threshold value; and said previously recorded corrector term, if said second difference is less than or equal to said threshold value; and means for recording the selected corrector term.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
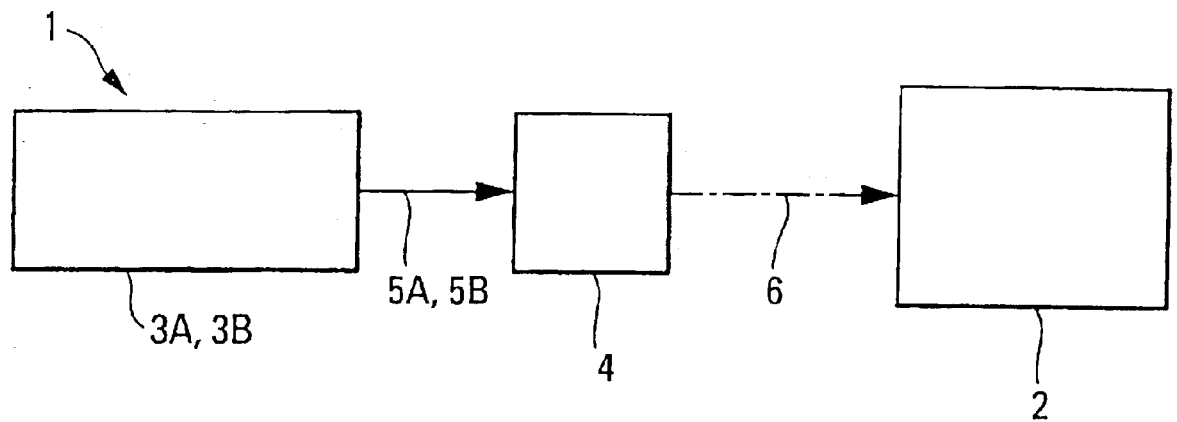
FIG. 1 is the schematic diagram of a device in accordance with the invention.

The device 1 in accordance with the invention and represented diagrammatically in FIG. 1 is an autothrust device and is intended for automatically controlling the thrust of at least one engine 2 of an aircraft, in particular of a transport airplane, during a phase of horizontal flight at stabilized speed, in particular during a phase of cruising flight for a transport airplane.

This device 1 comprises:

a calculation unit 3A, 3B for automatically determining a control value of the rating of the engine or engines 2 of the aircraft; and standard means 4 for regulating the engine, which are connected by a link 5A, 5B to the calculation unit 3A, 3B, and which automatically apply the control values determined by said calculation unit 3A, 3B to said engine 2, as illustrated diagrammatically by a chain dotted line 6 in FIG. 1.

It is known that, depending on the engine manufacturer, the control of the rating of an engine 2 is expressed:

either in the form of a (control) parameter N1 which represents the speed of rotation of the engine 2;

or in the form of a (control) parameter EPR ("Engine Pressure Ratio") which represents the engine pressure ratio of said engine 2.

These two parameters N1 and EPR, when they are used as control value of the engine 2, make it possible to vary its thrust. There is therefore no fundamental difference between these parameters N1 and EPR when considering the control of the thrust of the engine 2. Consequently, the solution in accordance with the invention and presented hereinafter on the basis of the parameter N1 applies equally to the parameter EPR.

However, according to the invention, in a general manner, whatever the parameter N1 or EPR considered, the device 1 automatically and repeatedly carries out the following set of steps a) to f):

a) it measures an actual speed Vc corresponding to the actual value of the speed of the aircraft;

b) it determines a preset reference speed Vctgt corresponding to the speed of the aircraft, representative of the control value obtained from the previous set of steps a) to f) [that is to say carried out previously (earlier) with respect to the present set of steps];

c) it calculates a first difference between said actual speed Vc and said preset speed Vctgt;

d) it determines, for said control parameter N1 or EPR considered, an intermediate term dependent on said first difference, said intermediate term making it possible to obtain a corrector term;

e) it computes the sum of said corrector term and of an equilibrium term which produces an equilibrium rating of the engine 2 in the absence of disturbances so as to obtain said control value, said steps a) to e) being implemented by the calculation unit 3A, 3B; and f) it applies, with the aid of the means 4, the control value thus obtained to said engine 2.

According to the invention, in said step d), said device 1:

calculates a second difference between said intermediate term of the present set of steps and the corrector term of the previous set of steps;

compares this second difference with a predetermined threshold value S; and selects as corrector term for the present set of steps, that it uses in particular in said step e):

said intermediate term of the present set of steps, if said second difference is greater than said threshold value S; and said corrector term of the previous set of steps, if said second difference is less than or equal to said threshold value S.

Thus, as long as the second difference is less than or equal to the threshold value S, the same corrector term is retained so that the control value is not modified (the relatively stable equilibrium term being modified only when it is appropriate to vary the equilibrium rating, that is to say generally the preset speed). The control value (and thus the control of the rating or of the thrust) is therefore modified only when said second difference (which depends on said first difference) exceeds said threshold value S, that is to say when this is necessary for the feedback control of the speed, given the deviations (first difference) between the actual speed Vc and the preset speed Vctgt of the aircraft. Consequently, by virtue of the present invention, the rating of the engine or engines 2 is not regulated in a continuous (or permanent) manner, but it is regulated in a discrete manner. This results in a very appreciable improvement in the acoustic comfort of the passengers of the aircraft, since the sound frequencies of the noises emitted by the engine or engines 2 are no longer modified permanently.

Figure 2:
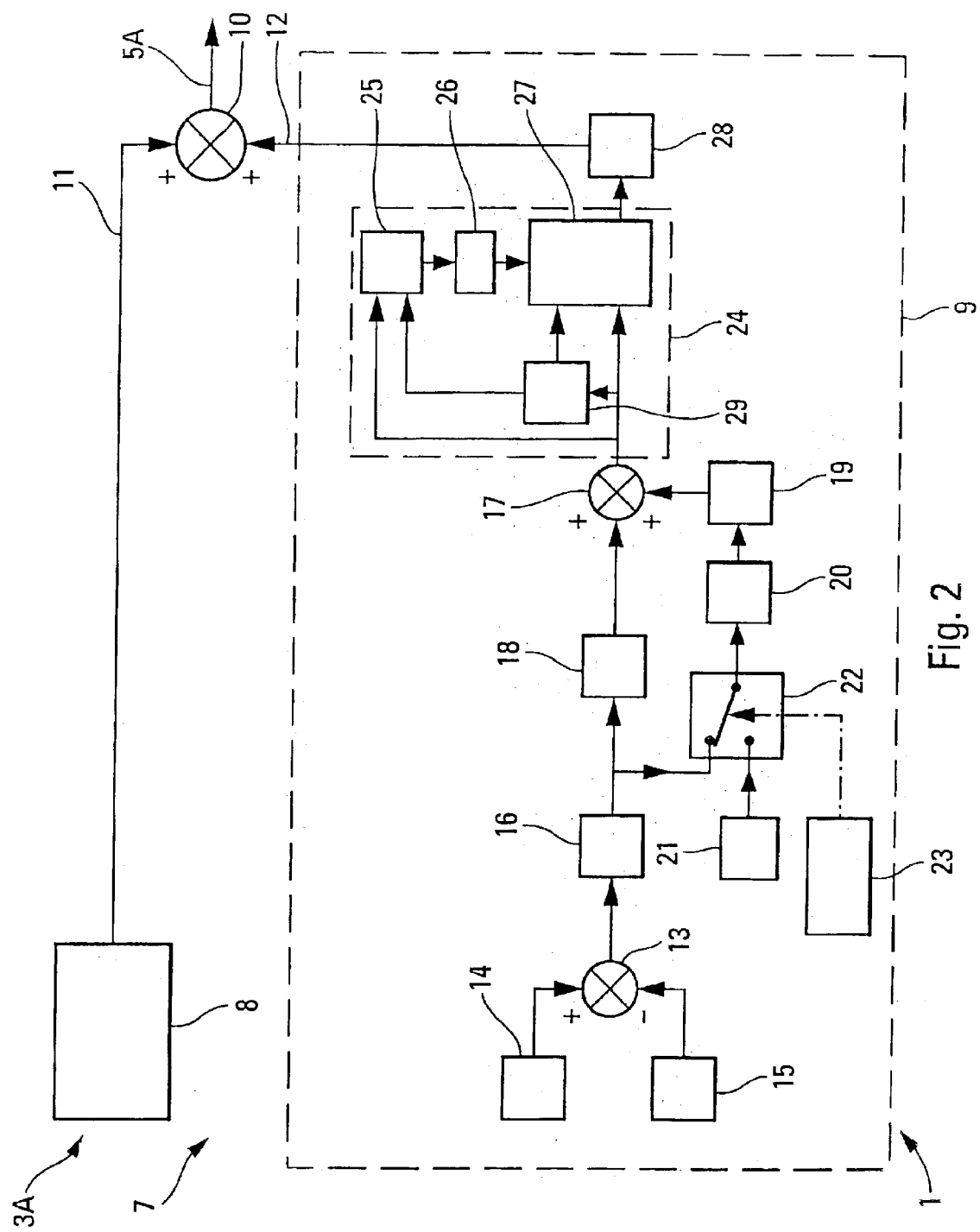
FIG. 2 diagrammatically shows a first embodiment of a calculation unit of a device in accordance with the invention.

In a first embodiment represented in FIG. 2, the calculation unit 3A comprises a calculation assembly 7 comprising:

a first unit 8 for determining in a standard fashion, as specified hereinbelow, an equilibrium term N1eq (equilibrium preset) which corresponds to the equilibrium engine rating, in the absence of disturbance of the flight conditions;

a second unit 9 for determining a corrector term $\Delta$N1f, as specified hereinbelow; and a summator 10 which is connected by links 11 and 12 respectively to said first and second units 8 and 9 and which computes the sum of said equilibrium term N1eq and of said corrector term $\Delta$N1f in such a way as to obtain a control value N1tgt which is transmitted to the means 4 by the link 5A (means 4 which therefore apply this control value N1tgt to the engine 2).

As may be seen in FIG. 2, the second unit 9 comprises a calculation means 13 which calculates the difference $\Delta$Vc between:

the preset speed Vctgt of the aircraft, which is received from a standard means 14; and the aircraft's actual speed Vc which is measured by a standard sensor 15, and which may possibly be filtered.

Said difference $\Delta$Vc emanating from the calculation means 13 is transmitted to a calculation means 16, which filters it, for example with a time constant of five seconds, so as to obtain a filtered difference DVc.

Said second unit 9 furthermore comprises a summator 17 which calculates an intermediate term $\Delta$N1 by computing the sum:

of a first term calculated by a calculation means 18 which, for this purpose, multiplies said filtered difference DVc by a predetermined coefficient KF; and of a second term which:

corresponds to the integration (by a calculation means 19) of the product (afforded by a calculation means 20) of said difference DVc and of a predetermined gain, when particular conditions specified hereinbelow relating to the speed Vc are fulfilled; or is equal to zero (the value "zero" arising from a memory 21), when these particular conditions are not fulfilled.

According to the invention, these particular conditions correspond to the following conditions:

the difference DVc is greater than a predetermined value, for example 0.5 knots; and the actual speed Vc does not diverge significantly from the preset speed Vctgt.

To this end, a switch 22, which is controlled by a control means 23 comprising said particular conditions, is arranged between, on the one hand, the outputs of the calculation means 16 and of the memory 21 and, on the other hand, the input of the calculation means 20.

According to the invention, said second unit 9 furthermore comprises a subsystem 24 which includes:

a calculation means 25 for calculating a second difference $\Delta$2 between said intermediate term $\Delta$N1 and a previously recorded corrector term $\Delta$N1mem;

a comparator 26 for comparing this second difference $\Delta$2 with a predetermined threshold value S;

a means of selection 27 for selecting as corrector term $\Delta$N1f:

said intermediate term $\Delta$N1, if said second difference $\Delta$2 is greater than said threshold value S; and said previously recorded corrector term $\Delta$N1mem, if said second difference $\Delta$2 is less than or equal to said threshold value S, said means of selection 27 transmitting the corrector term $\Delta$N1f thus selected to the summator 10, preferably after filtering by a filtering means 28; and a memory 29 for recording the selected corrector term, the value of which will be used subsequently by the comparator 26.

These characteristics make it possible, advantageously, to keep $\Delta$N1mem stable so long as its value remains close (deviation less than the threshold value S) to the value $\Delta$N1 which would make it possible to carry out the feedback control of the speed Vc to the preset Vctgt. Thus, the rating of the engine or the engines 2 is not modified continuously, but only when necessary for the feedback control of the speed, given the deviations allowed between the latter and its preset. This results in an improvement to the acoustic comfort of the passengers.

According to a preferred embodiment of the invention, the threshold value S is substantially equal to 0.5% of the preset value N1prst of the speed of rotation N1 of the engine 2. This value N1prst is determined empirically, in particular with the aid of physiological studies performed on passengers.

According to another preferred embodiment of the invention, the filtering means 28 which exhibits a time constant $\tau$ is intended for softening the variations in the engine rating during step-wise alterations in $\Delta$N1mem, thereby also improving the acoustic comfort of the passengers. Preferably, the time constant $\tau$ is equal to five seconds. This value is also determined empirically by means of physiological studies performed on passengers.

It will be noted moreover that the equilibrium term N1eq can be calculated in standard fashion on the basis of known laws that are integrated into the first unit 8.

By way of illustration, this equilibrium term N1eq can be calculated on the basis of the following equations:

$$N1eq = N1R * \sqrt{Tt/288.15}$$

-continued $$\text{with} \begin{cases} N1R = f_1(FNR, M) \\ FNR = Fn * 101325/Pt \\ Fn = m * g * (\sin\gamma + (Cx/Cz) * \cos\gamma) \end{cases}$$

$$\text{and} \begin{cases} Cx = f(Cz^2, M) \\ Cz = (m * g * \cos\gamma)/(0.7 * Ps * Sr * M^2) \end{cases}$$

in which the following parameters are used:
Fn: the thrust of the engine 2 (N);
m: the weight of the aircraft (kg);
g: the acceleration due to gravity ($\approx 9.81$ m/s$^2$);
γ: the slope of the aircraft (rd);
M: the Mach number;
Ps: the static pressure (Pa);
Sr: a reference area (m$^2$);
Cx: the coefficient of drag;
Cz: the coefficient of lift;
Tt: the total temperature (degrees Kelvin); and
Pt: the total pressure (Pa).

It will be noted moreover that, in the case of the EPR parameter, there is no reduced value such as the value N1R. Hence, the equilibrium term EPReq is calculated directly, in a known manner, as a function of FNR and of M: EPReq=$f_2$ (FNR, M).

Figure 3:
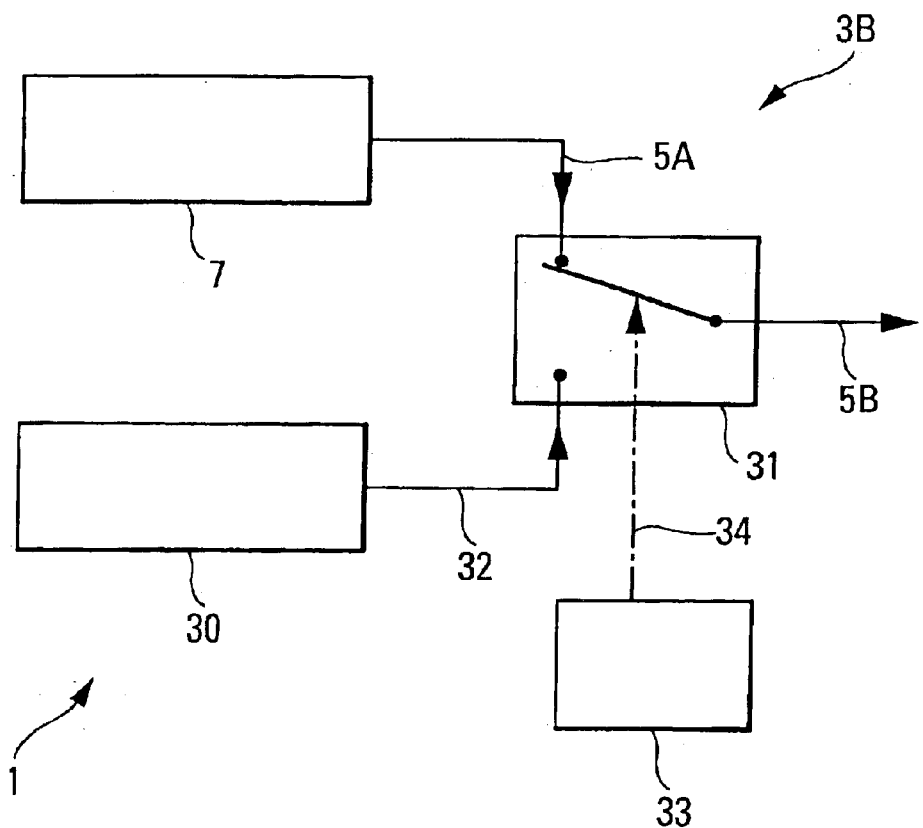
FIG. 3 diagrammatically shows a second embodiment of a calculation unit of a device in accordance with the invention.

In another embodiment 3B represented in FIG. 3 and corresponding to an application of the embodiment 3A, the device 1 comprises, in addition to the previously described calculation assembly 7:
a calculation assembly 30 which implements a standard process of thrust control, such as one exists on a known autothrust system;
a means of switching 31, whose input is connected to the outputs (by links 5A and 32) of said calculation assemblies 7 and 30, and which makes it possible to switch between said two calculation assemblies 7 and 32 so as to transmit to its output (via the link 5B which is connected to the means 4 of FIG. 1) either the value provided by the calculation assembly 7, or the value provided by the calculation assembly 30; and
a control unit 33 which automatically controls said switch 31, as illustrated by a chain-dotted link 34, as a function of predetermined conditions.

According to the invention, the device 1 takes account of the results of said standard control process (implemented by the calculation assembly 30) under normal operation, and it automatically switches into said control process in accordance with the invention (calculation assembly 7) so as to take account of the results of the latter process when at least one of a plurality of predetermined conditions is satisfied.

In a preferred embodiment, said predetermined conditions comprise at least the following conditions:
the actual speed Vc is stabilized, being to within a predetermined value, equal to the preset speed Vctgt;
the conditions of calculation of said equilibrium term N1eq are valid;
an autothrust function of the aircraft is engaged in speed holding mode; and
an automatic pilot of the aircraft is active in altitude holding mode.

What is claimed is:

1. A process of automatic control of the thrust of at least one engine of an aircraft during a phase of horizontal flight at stabilized speed, according to which process the thrust of the engine is controlled by applying a control value thereto which corresponds to the value of a predetermined control parameter representative of the rating of said engine, and according to the process the following set of steps is carried out automatically and repeatedly:
a) an actual speed corresponding to the actual value of the speed of the aircraft is measured;
b) a preset reference speed corresponding to the speed of the aircraft, representative of a control value obtained from a previous iteration of steps a) through f), is determined;
c) a first difference between said actual speed and said preset speed is calculated;
d) an intermediate term dependent on said first difference is determined for said control parameter, said intermediate term making it possible to obtain a corrector term;
e) a sum is computed of said corrector term and of an equilibrium term which produces an equilibrium rating of the engine in the absence of disturbances so as to obtain said control value; and
f) the control value thus obtained is applied to said engine, wherein step d) includes:
calculating a second difference between said intermediate term of the present set of steps and a corrector term selected in the previous iteration of steps a) through f);
comparing this second difference with a predetermined threshold value; and
selecting one of the following as corrector term for the present set of steps, that is used in particular in step e):
said intermediate term of the present set of steps, if said second difference is greater than said threshold value; and
said corrector term of the previous set of steps, if said second difference is less than or equal to said threshold value.

2. The process as claimed in claim 1, wherein said selected corrector term is filtered before using it in step e).

3. The process as claimed in claim 1, wherein said predetermined control parameter is the speed of rotation of the engine.

4. The process as claimed in claim 3, wherein said threshold value is equal to 0.5% of the preset value of the speed of rotation of the engine.

5. The process as claimed in claim 3, wherein in step d), said intermediate term is determined by computing the sum:
of a first term which is proportional to said first difference; and
of a second term which:
corresponds to the integration of said first difference, if said first difference is greater than a predetermined value and if said actual speed does not diverge substantially from said preset speed; and
is equal to zero, if at least one of the above conditions is not satisfied.

6. The process as claimed in claim 1, wherein said predetermined control parameter is the engine pressure ratio of said engine.

7. A device for controlling the thrust of at least one engine of an aircraft during a phase of horizontal flight at stabilized speed, said device comprising:
means for measuring an actual speed corresponding to the actual value of the speed of the aircraft;
means for determining a preset speed corresponding to the aircraft's speed representative of a control value;

means for calculating a first difference between said actual speed and said preset speed;

means for determining, for a control parameter, an intermediate term dependent on said first difference, said intermediate term making it possible to obtain a corrector term;

means for computing a sum of said corrector term and of an equilibrium term which produces an equilibrium rating of the engine in the absence of disturbances so as to obtain the control value; and means for applying the control value thus obtained to said engine, which device moreover comprises:

means for calculating a second difference between said intermediate term and a previously recorded corrector term;

means for comparing this second difference with a predetermined threshold value;

means for selecting as corrector term:
said intermediate term, if said second difference is greater than said threshold value; and
said previously recorded corrector term, if said second difference is less than or equal to said threshold value; and means for recording the selected corrector term.

8. A process of automatic control of the thrust of at least one engine of an aircraft during a phase of horizontal flight at stabilized speed, according to which process the thrust of the engine is controlled by applying a control value thereto which corresponds to the value of a predetermined control parameter representative of the rating of said engine, and according to the process the following set of steps is carried out automatically and repeatedly:

a) an actual speed corresponding to the actual value of the speed of the aircraft is measured;

b) a preset reference speed corresponding to the speed of the aircraft, representative of a control value obtained from a previous iteration of steps a) through f), is determined;

c) a first difference between said actual speed and said preset speed is calculated;

d) an intermediate term dependent on said first difference is determined for said control parameter, said intermediate term making it possible to obtain a corrector term;

e) a sum is computed of said corrector term and of an equilibrium term which produces an equilibrium rating of the engine in the absence of disturbances so as to obtain said control value;

f) the control value thus obtained is applied to said engine, wherein step d) includes:

calculating a second difference between said intermediate term of the present set of steps and a corrector term selected in the previous iteration of steps a) through f);

comparing this second difference with a predetermined threshold value; and selecting one of the following as corrector term for the present set of steps, that is used in particular in step e)
said intermediate term of the present set of steps, if said second difference is greater than said threshold value; and
said corrector term of the previous set of steps, if said second difference is less than or equal to said threshold value; and g) automatically switching from a first control process to the control process defined by steps a) through f) when a predetermined condition is satisfied, wherein:

the first control process is a process of controlling the engine thrust that takes into account results of the first control process under normal operation, and the control process of steps a) through f) takes into account the results of steps a) through f).

9. The method as claimed in claim 8, wherein said predetermined conditions comprise at least the following conditions:

the actual speed is stabilized, being to within a predetermined, equal to the preset speed;

the conditions of calculation of said equilibrium term are valid;

an autothrust function of the aircraft is engaged in speed holding mode; and an automatic pilot of the aircraft is active in altitude holding mode.

* * * * *